United States Patent
Headley et al.

[11] Patent Number: 5,953,353
[45] Date of Patent: Sep. 14, 1999

[54] ARTICLE COMPRISING AN IMPROVED RARE EARTH-DOPED OPTICAL FIBER LASER

[75] Inventors: Clifford Headley, Highland Park; Kenneth Lee Walker, New Providence, both of N.J.

[73] Assignee: Lucent Technologies Inc., Murray Hill, N.J.

[21] Appl. No.: 08/974,952

[22] Filed: Nov. 20, 1997

[51] Int. Cl.⁶ .................................. H01S 3/30; G02B 6/02
[52] U.S. Cl. ............................ 372/6; 385/42; 385/123; 359/154; 359/160
[58] Field of Search .................... 372/6; 385/42, 385/123; 359/154, 160

[56] References Cited

U.S. PATENT DOCUMENTS

| | | | |
|---|---|---|---|
| 3,838,358 | 9/1974 | Vanderleeden | 372/6 X |
| 4,782,491 | 11/1988 | Snitzer | 372/6 |
| 4,815,079 | 3/1989 | Snitzer | 372/6 |
| 5,237,576 | 8/1993 | DiGiovanni et al. | 372/6 |
| 5,268,910 | 12/1993 | Huber | 372/6 |
| 5,305,335 | 4/1994 | Ball et al. | 372/6 |
| 5,317,576 | 5/1994 | Leonberger et al. | 372/6 |
| 5,323,404 | 6/1994 | Grubb | 372/6 |
| 5,422,897 | 6/1995 | Wyatt et al. | 372/6 |
| 5,561,675 | 10/1996 | Bayon et al. | 372/6 |
| 5,677,920 | 10/1997 | Waarts et al. | 372/6 |

*Primary Examiner*—Brian Healy
*Attorney, Agent, or Firm*—Eugene E. Pacher

[57] ABSTRACT

At least some rare earth-doped optical fiber lasers are subject to self-pulsing and/or relatively high noise. We have found that these shortcomings can be eliminated if the cavity length of the fiber laser is increased, typically by inclusion of a length $\Lambda$ of rare earth-free conventional (single mode) transmission fiber in the cavity, with $\Lambda > 0.3L$, where L is the effective cavity length of the laser.

4 Claims, 3 Drawing Sheets

ARTICLE COMPRISING AN IMPROVED
RARE EARTH-DOPED OPTICAL FIBER
LASER

FIELD OF THE INVENTION

This application pertains to rare earth (RE) doped optical fiber lasers, and to articles (e.g., optical fiber communication systems) that comprise such a laser.

BACKGROUND

RE-doped optical fiber lasers are known and have many potentially important uses, e.g., as pump sources for optical fiber amplifiers, or in laser printers. Among the known RE-doped fiber lasers are cladding-pumped fiber lasers (CPFL). See, for instance, U.S. Pat. No. 4,815,079.

Although such cladding-pumped fiber lasers are potentially very useful, we have encountered with at least some such lasers a problem that needs to be overcome before the lasers can be reliably used. Specifically, we have encountered random self-pulsing at the lasing wavelength of Yb-doped CPFLs, and relatively high values of noise in these lasers. FIG. 7 illustrates the problem. It shows the normalized voltage output as a function of time of a photodetector on which the output of an exemplary Yb-doped CPFL is incident.

Such pulsing is detrimental because, for instance, it can give rise to unwanted signal modulation, and may cause damage to the pump laser diodes and/or downstream optical components. In addition, the noise that this pulsing represents makes the laser useless for applications in, for instance, the printer market, where very stable sources are needed. The pulsing is not limited to Yb-doped CPFL but can occur also in other RE-doped optical fiber lasers.

In view of the potential problems that may be caused by self-pulsing and high noise values, it would be highly desirable to have available simple means that can prevent the self-pulsing and high noise in RE-doped optical fiber lasers. This application discloses such means.

SUMMARY OF THE INVENTION

Self-pulsing of a RE-doped fiber laser of the type shown in FIG. 7 can be due to a variety of mechanisms, including relaxation oscillations, saturable absorption effects, and pump diode fluctuations. Regardless of the underlying mechanism that causes the oscillations and/or noise, we have discovered that the shortcomings can be reliably prevented by a simple structural modification of the RE-doped fiber laser. The modification comprises extending the length of the laser cavity by providing an additional length of RE-free conventional single mode optical fiber in the laser cavity, typically at the output end of the cavity. Length Λ of the RE-free conventional single mode fiber in the laser cavity typically is greater than 30% of the cavity effective length L. The cavity effective length is defined in conventional fashion, as the effective spacing between the two Bragg reflectors that form the cavity.

More specifically, the invention is embodied in an article (e.g., an optical fiber communication system or an optical fiber laser) that comprises an optical fiber transmission path that includes a length of rare earth (RE)-doped optical fiber, means for providing pump radiation from a source of pump radiation to the RE-doped optical fiber, and RE-free single mode optical fiber for receiving a laser output radiation from the RE-doped optical fiber. The optical fiber transmission path further comprises a high reflectivity first reflector and a low reflectivity second reflector (typically conventional in-line refractive index Bragg reflectors), the reflectors disposed in the optical fiber transmission path such that the optical fiber transmission path between the reflectors comprises at least a portion (typically all) of the length of RE-doped optical fiber, with the reflectors defining a laser cavity of effective length L.

Significantly, the laser cavity comprises a length Λ of said RE-free single mode optical fiber, typically disposed between said RE-doped optical fiber and the second reflector, where Λ>0.3L, preferably >0.5L.

It will be understood that all recited fibers other than the RE-doped optical fiber are essentially free of rare earth atoms, i.e., they are not intentionally doped with rare earth atoms. Such fibers will be referred-to as "RE-free" fibers.

The above referred-to "means for providing pump radiation from a source of pump radiation to the RE-doped optical fiber" can comprise a "coreless" fiber as shown for instance in FIG. 4, or can comprise a reflective feature in an optical fiber, the feature selected to direct laterally incident pump radiation into the downstream axial direction of the fiber. Such means are known in the art. The latter approach to providing the pump radiation to the RE-doped fiber is generally referred to as "side coupling".

The drawings are not to scale or proportional.

DETAILED DESCRIPTION OF AN
EXEMPLARY EMBODIMENT

The discussion below will be in terms of a CPFL, more specifically, a Yb-doped CPFL. This is not meant to imply limitation of the invention to Yb-doped CPFLs.

Figure 1:
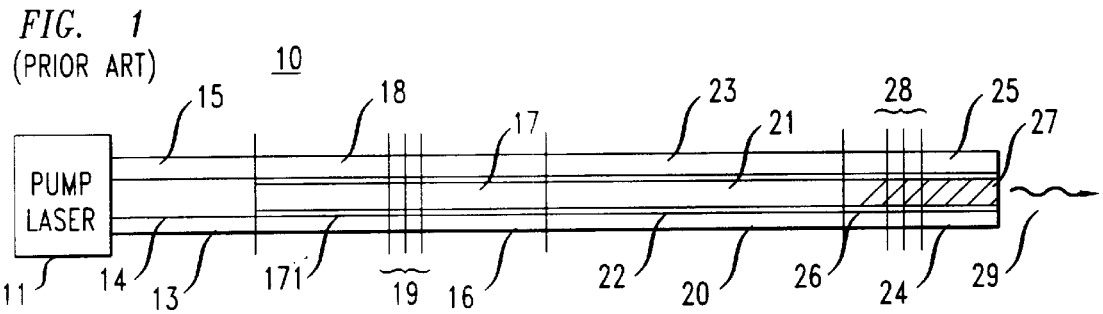
FIG. 1 schematically shows an exemplary prior art RE-doped fiber laser, namely, a Yb-doped cladding pumped laser.

FIG. 1 schematically depicts an exemplary prior art Yb-doped CPFL 10, wherein numeral 11 refers to a pump laser, exemplarily a commercially available semiconductor diode array. The pump laser output (exemplarily having 915 nm wavelength) is coupled into "coreless" fiber 13 and propagates therein to multimode fiber 16. The "coreless" fiber is a known elongate (exemplarily 4–5 m) member comprising a glass fiber (diameter exemplarily 125 $\mu$m) 14 of uniform refractive index that is surrounded by a polymer coating 15. The multimode fiber 16 exemplarily is 1–2 m long and has a Ge-doped core region 17 (diameter exemplarily 5.4 $\mu$m) surrounded by a silica cladding 171 (diameter exemplarily 125 $\mu$m or 200 $\mu$m) and a polymer coating 18. Into the Ge-containing core of the multimode fiber is "written" high reflectivity (exemplarily >98% at the laser wavelength, e.g., 1064 nm) grating 19. Techniques for "writing" such gratings are well known.

The radiation from pump laser 11 propagates through multimode fiber 16 to Yb-doped cladding pumped fiber 20 of exemplary length 12 m. The fiber comprises a single mode core 21 (exemplarily doped in known manner with Ge, P and Al), and further doped with Yb (inner cladding 22 has a lower refractive index than the core but a higher refractive index than polymer outer cladding 23. Such "dual-clad" fibers are known). Exemplarily the inner cladding has star-shaped cross section (see, for instance, U.S. Pat. application Ser. No. 08/856,708, filed May 15, 1997, pending, which is a continuation of application Ser. No. 08/561,682, filed Nov. 22, 1995), abandoned, with diameter of about 125 or 200 $\mu$m. Absorption of the 915 nm pump light by the Yb in core 21 leads in known manner to emission of, e.g., 1064 nm single mode laser radiation, and propagation of that radiation to single mode fiber 24. The fiber has conventional Ge-doped core 27, cladding 26 and polymer coating 25. Into the Ge-containing core of the fiber is written low reflectivity (e.g., ~8%) grating 28 in known manner.

Bragg gratings 19 and 28 form a laser cavity of effective length L, exemplarily about 16 m. The cavity typically is only slightly (e.g.,<50%) longer than the RE-doped fiber 20, since gratings 19 and 28 conventionally are fairly close to the respective ends of the RE-doped fiber. Laser radiation 29 that is not reflected back into the laser cavity by low-reflectance grating 28 propagates downstream in single mode fiber 24 and is available for utilization, e.g., for pumping amplifiers. The different fibers of the CPFL of FIG. 1 are joined by splicing in known manner. Lasers as described above frequently are subject to self-pulsing and/or high noise.

Our theoretical analysis of RE-doped fiber lasers suggests that increase of the time of photon residence in the laser cavity is likely to decrease the likelihood of self-pulsing and noise.

Although the photon residence time $\tau_c$ could in principle be increased in several different ways, of which perhaps the simplest involves increasing the reflectivity of the low-reflectance Bragg grating (also referred to as the output coupler), we have found that increasing $\tau_c$ by increasing the reflectivity of the output coupler does, contrary to expectations, not significantly decrease pulsing and noise (and somewhat decreases the laser power), whereas increasing $\tau_c$ by increasing the cavity length significantly reduces pulsing and noise, substantially without decreased laser power.

Figure 2:
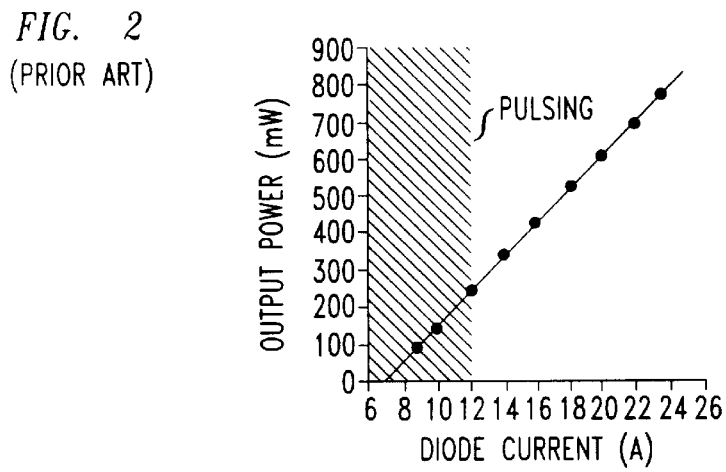
FIGS. 2 and 3 show data on laser output power vs. pump diode current, for two lasers of the type shown in FIG. 1 that differ with regard to the reflectivity of the output coupler.
Figure 3:
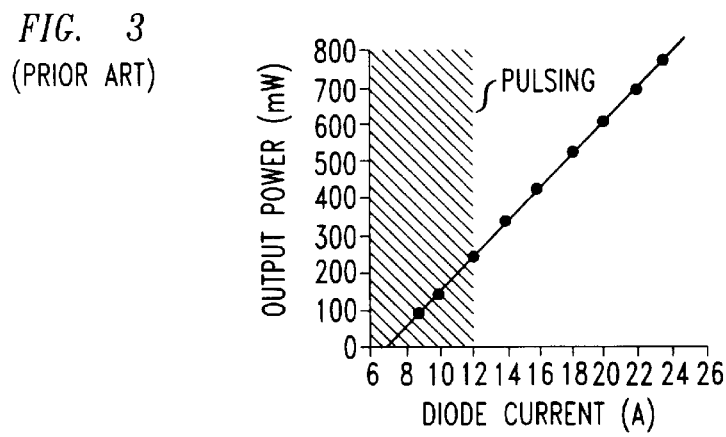

FIGS. 2 and 3 show data on laser output power vs. drive current of the pump laser. The set-up was substantially as shown in FIG. 1. The 16 m long cladding pumped fiber was Yb-doped, with 0.53 dB/m absorption of the 915 nm pump light in the Yb-doped core. The upstream Bragg reflector had essentially 100% reflectivity at the laser wavelength (1074 nm). FIGS. 2 and 3 show data for 8.5% and 20% reflectivity of the output coupler, respectively. The shaded regions represent the regime in which pulsing of the CPFL occurred. As can be seen from the data, increasing $\tau_c$ by increasing the reflectivity of the output coupler is generally not effective. Furthermore, increasing reflectivity from 8.5% to 20% (which resulted in an increase in $\tau_c$ from 78 ns to 120 ns) resulted in a 0.3 dB drop in the output power of the laser. Thus, increasing $\tau_c$ by increasing the reflectivity of the output coupler is generally not a preferred approach to elimination of self-pulsing and noise reduction.

The preferred option for increasing $\tau_c$ involves increasing the laser cavity length. Although in principle an increase in cavity length could be achieved by increasing the length of RE-doped fiber, this is not a preferred approach. The length of RE-doped fiber is an important parameter for the optimization of the laser cavity (especially in 3-level laser systems such as Yb-doped fiber lasers) and thus typically is not freely adjustable. Furthermore, increasing the length of RE-doped fiber reduces the number of lasers that can be made from a given preform and thus raises the cost per laser. Still furthermore, RE-doped fiber is more costly per unit length than ordinary transmission fiber, and therefore increasing the length of RE-doped fiber would raise the cost of RE-doped lasers.

In view of the above discussed considerations, it is currently preferred to increase $\tau_c$ by increasing the laser cavity length by adding single mode RE-free optical fiber to the laser cavity, typically by adding it such that the distance between the downstream end of the RE-doped fiber and the output coupler is increased. In a laser according to the invention the length $\Lambda$ of RE-free single mode fiber in the cavity typically is greater than 30%, frequently greater than 50% of the effective length L of the laser cavity.

Figure 4:
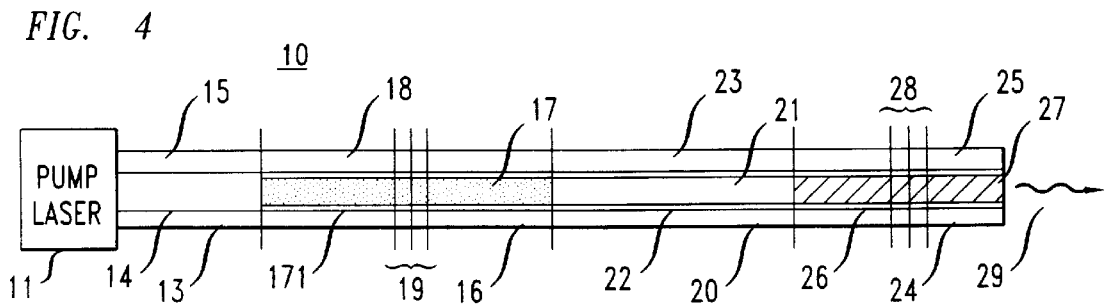
FIG. 4 schematically depicts an exemplary laser according to the invention, namely, a Yb-doped cladding pumped laser with a significant length of RE-free single mode fiber in the laser cavity.

An exemplary laser 40 according to the invention is schematically depicted in FIG. 4. As can be readily seen, the embodiment of FIG. 4 closely resembles the prior art laser of FIG. 1, except that in the former the laser cavity comprises a considerably greater length of RE-free single mode fiber 44 than is present in the latter. The added cavity length directly translates into increased photon residence time $\tau_c$, which in turn resulted in elimination of self-pulsing, as can be seen from FIGS. 5 and 6.

Figure 5:
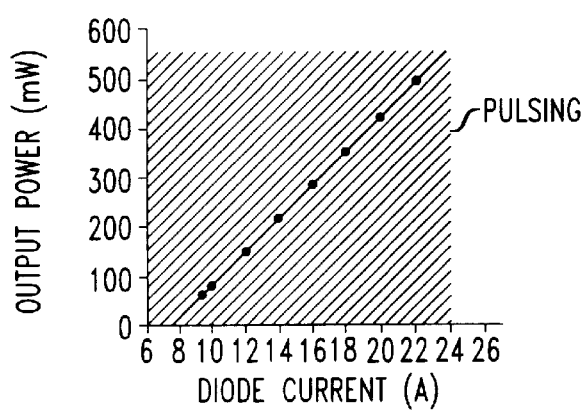
FIGS. 5 and 6 show data on laser output power vs. pump diode current, for a prior art laser of the type shown in FIG. 1 and for a corresponding laser according to the invention.
Figure 6:
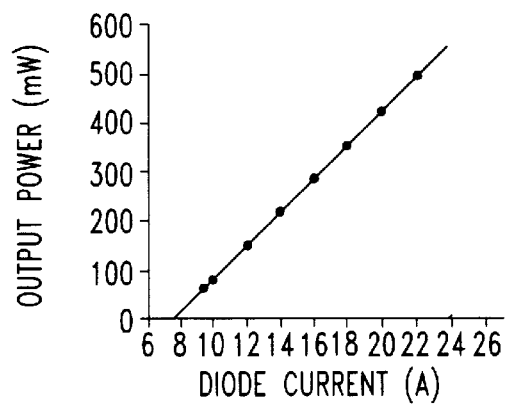
Figure 7:
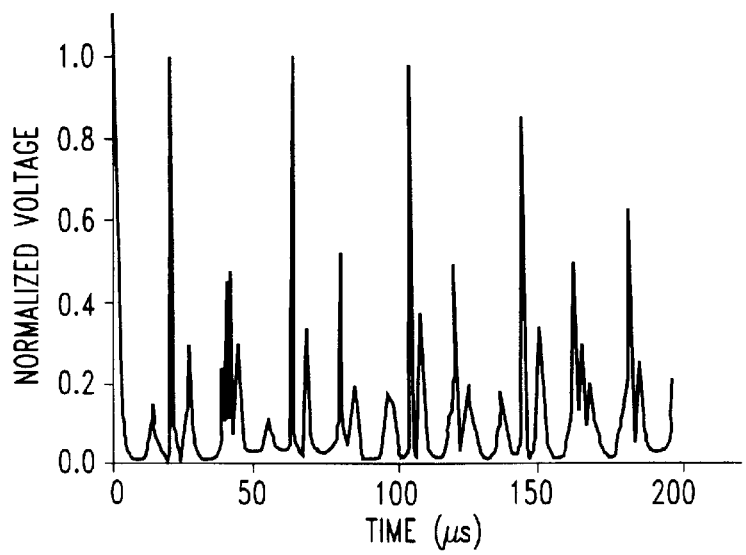
FIG. 7 shows photodetector output vs. time, for light from a prior art Yb-doped cladding pumped fiber laser incident on the photodetector.

The data of FIG. 5 was obtained with a prior art CPFL as shown in FIG. 1, with 16m of Yb-doped cladding pumped fiber substantially forming the laser cavity. As can be seen, the prior art laser is subject to pulsing for all diode currents up to 24A. FIG. 6 pertains to a corresponding laser according to the invention, with the laser cavity containing 50 m of RE-free single mode fiber in addition to 12 m of Yb-doped cladding pumped fiber. As can be seen from FIG. 6, the laser according to the invention did not experience self-pulsing.

Those skilled in the art will appreciate that embodiments of the invention are not limited to the arrangement of FIG. 4. For instance, the extra length of RE-free single mode fiber can be positioned substantially anywhere in the cavity, either in one piece or in a multiplicity of pieces.

Figure 8:
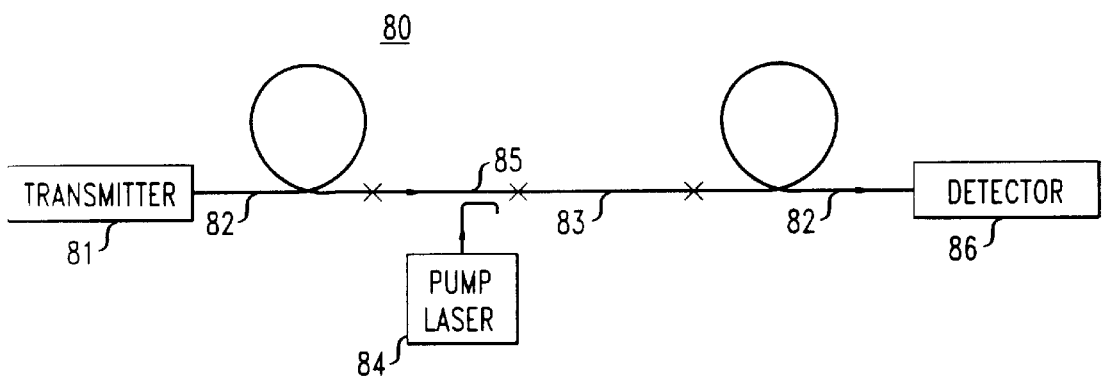
FIG. 8 schematically shows an exemplary optical communication system according to the invention.

FIG. 8 schematically depicts an exemplary optical fiber communication system 80 that comprises a transmitter 81, a receiver 86, and an optical fiber transmission path signal-transmissively connecting transmitter and receiver. The transmission path comprises transmission fiber 82, Er-doped amplifier fiber 83, and coupler 85. The "X" symbols indicate splices, as is conventional. Pump laser 84 is a laser according to the invention, exemplarily as shown in FIG. 4. The output of the laser is coupled into the signal transmission path in conventional manner, and serves to pump amplifier fiber 83.

The invention claimed is:

1. An article comprising an optical fiber laser comprising an optical fiber path that comprises a) a length of rare earth-doped optical fiber;

b) means for providing pump radiation from a source of pump radiation to said rare earth-doped optical fiber;

c) single mode optical fiber for receiving a laser output radiation from said rare earth-doped optical fiber; and d) a high reflectivity first reflector and a low reflectivity second reflector, said reflectors disposed in said optical fiber path such that the optical fiber path between said reflectors comprises at least a portion of said length of rare earth-doped optical fiber, said reflectors defining a laser cavity of effective length L;

CHARACTERIZED IN THAT e) said laser cavity comprises a length $\Lambda$ of said single mode optical fiber, where $\Lambda>0.3L$.

2. An article according to claim 1, wherein $\Lambda>0.5L$.

3. An article according to claim 1, wherein said length $\Lambda$ of single mode optical fiber is disposed between said rare earth-doped optical fiber and the second reflector.

4. An article according to claim 1, wherein the article is an optical fiber communication system comprising a transmitter, a receiver, and an optical fiber transmission path connecting the transmitter and the receiver, said transmission path comprising an Er-doped amplifier fiber, and further comprising a coupler for coupling said laser output radiation into said signal transmission path for pumping of said Er-doped amplifier fiber.

* * * * *